United States Patent Office 3,121,744
Patented Feb. 18, 1964

3,121,744
PREPARATION OF N-(HALOALKYL)AMINES
John P. Luvisi, Park Ridge, Ill., assignor to Universal Oil Products Company, Des Plaines, Ill., a corporation of Delaware
No Drawing. Filed Sept. 21, 1959, Ser. No. 841,002
10 Claims. (Cl. 260—577)

This invention relates to a method for preparing N-(haloalkyl)amines and more particularly to a method for preparing said amines in the presence of a novel catalyst.

An object of this invention is to prepare N-(haloalkyl) amines by treating an amine containing at least one amino substituent with polyhaloalkyl compound.

One embodiment of this invention resides in a process for the preparation of an N-(haloalkyl)amine which comprises treating compounds selected from the group consisting of alkylamines and arylamines, said compound containing at least one amino substituent, with a polyhaloalkane in the presence of a zinc-copper couple catalyst.

Another embodiment of this invention is found in a process for the preparation of an N-(haloalkyl)amine which comprises treating a compound selected from the group consisting of alkylamines and arylamines, said compound containing at least one amino substituent, with a polyhaloalkane in an inert organic solvent at a temperature in the range of from about 0° to about 250° C. in the presence of a zinc-copper couple catalyst.

A specific embodiment of the invention is found in a process for the preparation of an N-(haloalkyl)amine which comprises treating aniline with a polyhaloalkane in an inert organic solvent at a temperature in the range of from about 0° to about 250° C. in the presence of a zinc-copper couple catalyst.

A more specific embodiment of the invention is found in a process for the preparation of an N-(haloalkyl) amine which comprises treating aniline with chloroform in diethyl ether at a temperature in the range of from about 35° to about 150° C. in the presence of a zinc-copper couple catalyst to form N-(chloromethyl)aniline.

Other objects and embodiments referring to alternative alkylamines, arylamines and polyhaloalkanes as well as to alternative organic solvents will be found in the following further detailed description of the invention.

The products of the present invention comprising N-(haloalkyl)amines will find a wide variety of uses in the chemical field. For example the product resulting from the condensation of carbon tetrachloride ($CCl_4$) with aniline, namely, N-(dichloromethyl)aniline will find a use as an insecticide, especially against houseflies. Yet another use for these compounds would be as intermediates in the preparation of other organic compounds. An example of this is the product resulting from the condensation between chloroform ($HCCl_3$) and aniline, namely, N-(chloromethyl)aniline which may be treated with water in the presence of a magnesium catalyst to form the alcohol. Furthermore, if the prior compound is treated with a strong alkali such as potassium hydroxide or sodium hydroxide an isocyanide may be formed.

As hereinbefore set forth this invention is concerned with the condensation of an alkyl- or arylamine containing at least one amino substituent with a polyhaloalkane in the presence of a catalyst which comprises a zinc-copper couple. The catalyst which is used in the process of this invention may be prepared by heating zinc dust and copper oxide at a temperature of about 500° C. in a reducing atmosphere consisting of hydrogen gas, the ratio of zinc dust to copper oxide being approximately 8:1, to form the desired couple.

Examples of alkylamines and arylamines containing only carbon, hydrogen and nitrogen atoms which may be used in this invention include alkyl monoamines such as methylamine, ethylamine, n-propylamine, isopropylamine, 1-butylamine, 2-butylamine, 1-pentylamine, 2-pentylamine, 3-pentylamine, 1-hexylamine, 2-hexylamine, 3-hexylamine, 1-heptylamine, 2-heptylamine, 3-heptylamine, etc.; alkyl diamines such as 1,2-ethylenediamine, 1,3-propylenediamine, 1,2-butylenediamine, 1,3-butylenediamine, 1,4-butylenediamine, 1,2-pentylenediamine, 1,3-pentylenediamine, 1,5-pentylenediamine, 1,2-hexylenediamine, 1,3-hexylenediamine, 1,4-hexylenediamine, 1,5-hexylenediamine, 1,6-hexylenediamine, 1,2-heptylenediamine 1,3-heptylenediamine, etc.; alkyl monoamines such as aniline o-toluidine, m-toluidine, p-toluidine, o - aminoethylbenzene, m - aminoethylbenzene, p - aminoethylbenzene, o - aminopropylbenzene, m - amino - propylbenzene, m-aminopropylbenzene, p-aminopropylbenzene, 3-amino-o-xylene, 4-amino-o-xylene, 2-amino-m-xylene, 4-amino-m-xylene, 6-amino-m-xylene, 2-amino-p-xylene, etc.; aryl diamines such as o-phenylenediamine, m-phenylenediamine, p-phenylenediamine, 2,3-diaminotoluene, 2,4-diaminotoluene, 2,5-diaminotoluene, 2,3-diaminoethylbenzene, 2,4-diaminoethylbenzene, 3,5-diaminoethylbenzene, etc. Polyhaloalkanes containing only carbon, hydrogen and halogen radicals which may be condensed with the aforementioned amines include dichloromethane, dibromomethane, diiodomethane, difluoromethane, trichloromethane (chloroform), tribromomethane (bromoform), triiodomethane (iodoform), tetrachloromethane (carbon tetrachloride), tetrabromomethane, tetraiodomethane, 1,1,1 - trichloroethane, 1,1,1 - tri - bromoethane, 1,1,1-triiodoethane, 1,1,1-trifluoroethane, 1,1,2-trichloroethane 1,1,2-tribromoethane, 1,1,2-triiodoethane, 1,1,2-trifluoroethane, 1,1,2,2-tetrachloroethane, 1,1,2,2-tetrabromoethane, 1,1,2,2-tetraiodoethane, 1,1,1-trichloropropane, 1,1,1-tribromopropane, 1,1,1-triiodopropane, 1,1,3-trichloropropane, 1,1,2-tribromopropane, 1,1,3-triiodopropane, 1,1,3,3-tetrachloropropane, 1,1,3,3-tetrabromopropane 1,1,3,3-tetraiodopropane, etc. It is also contemplated within the scope of this invention that polyhaloalkanes containing a mixture of halogen radicals may also be used such as 1,1-dichloro-2-bromoethane, 1,1-dichloro-2-iodoethane, 1,1-dichloro-2-fluoroethane, 1-chloro-1,2,2-trifluoroethane, etc., although not necessarily with equivalent results. It is to be understood that the aforementioned alkyl monoamines, alkyldiamines, aryl monoamines and aryldiamines as well as the polyhaloalkanes are only representatives of the types of compounds which may be used and that the present invention is not necessarily limited thereto.

The process of this invention is effected over a wide range of temperatures, the temperatures used to effect the reaction being in the range of from about 0° to about 250° C., the preferred range being from about 35° to about 150° C. In the preferred embodiment of the invention the reaction is carried out by refluxing the reactants for a predetermined residence time in a substantially inert organic solvent, said solvents including paraffinic hydrocarbons such as n-pentane, n-hexane, n-heptane, etc.; cyclic paraffinic hydrocarbons such as cyclopentane, cyclohexane, cycloheptane, methylcyclopentane, etc.; aromatic hydrocarbons such as benzenes, toluene, o-xylene, m-xylene, p-xylene, etc.; alcohols such as methyl alcohol, ethyl alcohol, propyl alcohol, isopropyl alcohol, etc.; and ethers such as dimethyl ether, diethyl ether, dipropyl ether, etc. Therefore, it is readily apparent that the particular temperature at which the reaction is effected will depend upon the solvent which is used. For example, when diethyl ether is used as the solvent the reaction will take place at temperatures ranging from about 35° to about 40° C. or more; when benzene is used as the solvent the reaction will be effected at temperatures ranging from about 80° to about 90° C.; or when toluene is used the reaction will be effected at temperatures ranging from about 110° to about 120° C. It is also contemplated within the scope of this invention that superatmospheric pressures ranging from about 2 to about 100 atmospheres or more may be used, the pressure being sufficient to maintain a major portion of the reactants in the liquid phase.

The process of this invention may be effected in any suitable manner and may comprise either a batch or a continuous operation. When a batch type operation is used a quantity of the amine and the polyhaloalkane are placed in an appropriate apparatus such as an alkylation flask or a rotating autoclave, the apparatus being dependent upon whether atmospheric or superatmospheric pressures are to be used in the reaction conditions. The zinc-copper couple and the solvent are placed in the apparatus which is then adjusted to the proper operating conditions of temperature and pressure. After completion of the desired reaction time the apparatus and contents thereof are allowed to cool to room temperature, the excess pressure, if any, is vented, and the reaction product is separated from the catalyst, washed, dried and subjected to fractional distillation, the desired N-(haloalkyl)amine being separated and recovered therefrom.

The process of the present invention may also be effected in a continuous type of operation. In this type of operation the reactants comprising the particular amine and the polyhaloalkane are continuously charged to a reaction zone which is maintained at the proper operating conditions of temperature and pressure at a liquid hourly space velocity (the amount of reactant per amount of catalyst per hour) in the range of from about 0.1 to about 20 or more, the preferred range being from about 0.5 to about 5. The reaction zone may comprise an unpacked vessel or coil or may be lined with an adsorbent packing material such as fire brick, alumina, dehydrated bauxite and the like. In a particularly preferred method of operation the zinc-copper couple catalyst is disposed as a fixed bed in the reaction zone while the aforesaid reactants pass through said bed in either an upward or downward flow. In addition the substantially inert organic solvent may be continuously charged to the reaction zone through a separate line or, if so desired, may be admixed with one or both of the reactants prior to entry into said reaction zone and charged thereto in a single stream. Upon completion of the desired residence time the reaction product is continuously withdrawn from the reactor, separated from the reactor effluent, purified and recovered by conventional means hereinbefore set forth while the unreacted materials may be recycled to form a portion of the feed stock.

In addition to the aforementioned fixed bed type of operation the process of this invention may also be effected by using a moving bed type of operation in which the catalyst bed and the reactants pass through the reaction zone either concurrently or countercurrently to each other, and the slurry type operation in which the catalyst is carried into the reaction zone as a slurry in one or the other of the reactants. In each of the latter two methods of operation the reaction product is continuously withdrawn and subjected to the same operations hereinbefore set forth whereby the desired product is separated and recovered.

The following examples are given to illustrate the process of the present invention, which, however, are not intended to limit the generally broad scope of the present invention in strict accordance therewith.

*Example I*

In this experiment 9.3 g. (0.1 mole) of aniline and 12 g. (0.1 mole) of chloroform are placed in a condensation flask provided with heating and stirring means. To this mixture is added 200 cc. of diethyl ether and 2 g. of the zinc-copper couple catalyst. The reaction mixture is heated to a temperature of about 35° C. and is maintained in the range of from about 35° to about 40° C. while refluxing for a period of about 10 hours. At the end of this time the flask and contents thereof are allowed to cool to room temperature and the reaction product is separated from the catalyst. Following this, said product is washed with water, dried and subjected to fractional distillation under reduced pressure, the desired cut comprising N-(chloromethyl)aniline being separated and recovered.

*Example II*

In this example 9.3 g. (0.1 mole) of aniline and 25 g. (0.1 mole) of bromoform (tribromomethane) are refluxed for a period of about 5 hours at a temperature ranging from about 35° to about 40° C. in the presence of 2 g. of zinc-copper couple catalyst and 200 g. of diethyl ether in a condensation flask similar to that described in Example I above. At the end of this time the flask and contents thereof are allowed to cool to room temperature, the reaction product is separated from the catalyst, washed with water, dried and subjected to fractional distillation under reduced pressure, the desired cut comprising N-(bromomethyl)aniline being separated and recovered therefrom.

*Example III*

In this experiment 10.8 g. (0.1 mole) of p-phenylenediamine and 12 g. (0.1 mole) of chloroform are refluxed at a temperature ranging from about 80° to about 90° C. in the presence of 2 g. of a zinc-copper couple catalyst and 200 cc. of benzene for a period of about 4 hours. As in the above examples at the end of the reaction time the flask and contents thereof are allowed to cool to room temperature, the product is separated from the catalyst, washed with water, dried and subjected to fractional distillation under reduced pressure, the desired cut comprising N,N'-(dichloromethyl)-p-phenylenediamine, being separated and recovered therefrom.

*Example IV*

In this experiment 10.7 g. (0.1 mole) of p-toluidine and 15.4 g. (0.1 mole) of carbon tetrachloride are refluxed at a temperature of about 80° to 90° C. for a period of about 12 hours in the presence of a zinc-copper couple catalyst and benzene. At the end of this time the flask and contents thereof are allowed to cool to room temperature and the desired product comprising N-(dichloromethyl)-p-toluidine is separated and recovered by conventional means hereinbefore set forth.

I claim as my invention:

1. A process for the preparation of an N-(haloalkyl)amine which comprises reacting a compound selected from the group consisting of alkylamines and arylamines, said compound consisting of carbon, hydrogen and nitrogen and containing at least one amino substituent, with an equimolar proportion of a polyhaloalkane in the presence of a zinc-copper couple catalyst resulting from the heating of zinc dust and copper oxide in a ratio of about 8:1 at about 500° C. in a hydrogen atmosphere, and recovering the resultant N-(haloalkyl)amine.

2. A process for the preparation of an N-(haloalkyl)amine which comprises reacting a compound selected from the group consisting of alkylamines and arylamines, said compound consisting of carbon, hydrogen and nitrogen and containing at least one amino substituent, with an equimolar proportion of a polyhaloalkane in an inert organic solvent at a temperature in the range of from about 0° to about 250° C. in the presence of a zinc-copper couple catalyst resulting from the heating of zinc dust and copper oxide in a ratio of about 8:1 at about 500° C. in a hydrogen atmosphere, and recovering the resultant N-(haloalkyl)amine.

3. A process for the preparation of an N-(haloalkyl)amine which comprises reacting equimolar proportions of aniline and a polyhaloalkane at a temperature in the range of from about 0° to about 250° C. in the presence of a zinc-copper couple catalyst resulting from the heating of zinc dust and copper oxide in a ratio of about 8:1 at about 500° C. in a hydrogen atmosphere, and recovering the resultant N-(haloalkyl)amine.

4. A process for the preparation of an N-(haloalkyl) amine which comprises reacting equimolar proportions of a phenylenediamine and a polyhaloalkane at a temperature in the range of from about 0° to about 250° C. in the presence of a zinc-copper couple catalyst resulting from the heating of zinc dust and copper oxide in a ratio of about 8:1 at about 500° C. in a hydrogen atmosphere, and recovering the resultant N-(haloalkyl)amine.

5. A process for the preparation of an N-(haloalkyl) amine which comprises reacting a compound selected from the group consisting of alkylamines and arylamines, said compound consisting of carbon, hydrogen and nitrogen and containing at least one amino substituent, with an equimolar proportion of chloroform in an inert organic solvent at a temperature in the range of from about 0° to about 250° C. in the presence of a zinc-copper couple catalyst resulting from the heating of zinc dust and copper oxide in a ratio of about 8:1 at about 500° C. in a hydrogen atmosphere, and recovering the resultant N-(haloalkyl)amine.

6. A process for the preparation of an N-(haloalkyl) amine which comprises reacting a compound selected from the group consisting of alkylamines and arylamines, said compound consisting of carbon, hydrogen and nitrogen and containing at least one amino substituent, with an equimolar proportion of carbon tetrachloride in an inert organic solvent at a temperature in the range of from about 0° to about 250° C. in the presence of a zinc-copper couple catalyst resulting from the heating of zinc dust and copper oxide in a ratio of about 8:1 at about 500° C. in a hydrogen atmosphere, and recovering the resultant N-(haloalkyl)amine.

7. A process for the preparation of N-(chloromethyl) aniline which comprises reacting equimolar proportions of aniline and chloroform in diethyl ether at a temperature in the range of from about 35° to about 150° C. in the presence of a zinc-copper couple catalyst resulting from the heating of zinc dust and copper oxide in a ratio of about 8:1 at about 500° C. in a hydrogen atmosphere, and recovering the resultant N-(chloromethyl)aniline.

8. A process for the preparation of N-(bromomethyl) aniline which comprises reacting equimolar proportions of aniline and bromoform in diethyl ether at a temperature in the range of from about 35° to about 150° C. in the presence of a zinc-copper couple catalyst resulting from the heating of zinc dust and copper oxide in a ratio of about 8:1 at about 500° C. in a hydrogen atmosphere, and recovering the resultant N-(bromomethyl)aniline.

9. A process for the preparation of N,N'-(dichloromethyl)-p-phenylenediamine which comprises reacting equimolar proportions of p-phenylenediamine and chloroform in benzene at a temperature in the range of about 35° to about 150° C. in the presence of a zinc-copper couple catalyst resulting from the heating of zinc dust and copper oxide in a ratio of about 8:1 at about 500° C. in a hydrogen atmosphere, and recovering the resultant N,N-(dichloromethyl)-p-phenylenediamine.

10. A process for the preparation of N-(dichloromethyl)-p-toluidine which comprises reacting equimolar proportions of p-toluidine and carbon tetrachloride in benzene at a temperature in the range of from about 35° to about 150° C. in the presence of a zinc-copper couple catalyst resulting from the heating of zinc dust and copper oxide in a ratio of about 8:1 at about 500° C. in a hydrogen atmosphere, and recovering the resultant N-(dichloromethyl)-p-toluidine.

References Cited in the file of this patent

UNITED STATES PATENTS

| | | |
|---|---|---|
| 1,221,077 | Morgan | Apr. 3, 1917 |
| 1,935,515 | Mills | Nov. 14, 1933 |
| 2,014,077 | Wilson | Sept. 10, 1935 |
| 2,432,552 | Williams et al. | Dec. 16, 1947 |
| 2,892,871 | Filbey et al. | June 30, 1959 |